United States Patent
Pearson

(10) Patent No.: US 7,912,311 B2
(45) Date of Patent: Mar. 22, 2011

(54) TECHNIQUES TO FILTER MEDIA SIGNALS

(75) Inventor: Adrian R. Pearson, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1365 days.

(21) Appl. No.: 11/085,943

(22) Filed: Mar. 21, 2005

(65) Prior Publication Data

US 2006/0210189 A1    Sep. 21, 2006

(51) Int. Cl.
    *G06K 9/40*    (2006.01)
(52) U.S. Cl. ......................................... 382/262
(58) Field of Classification Search ............... 382/262
    See application file for complete search history.

(56) References Cited

U.S. PATENT DOCUMENTS

| | | | | |
|---|---|---|---|---|
| 4,603,430 A | * | 7/1986 | Sacks ........................... | 382/206 |
| 4,800,511 A | * | 1/1989 | Tanaka ......................... | 382/262 |
| 4,928,258 A | * | 5/1990 | May ............................. | 708/320 |
| 5,315,699 A | * | 5/1994 | Imai et al. .................... | 345/502 |
| 5,493,619 A | * | 2/1996 | Haley et al. .................. | 382/199 |
| 6,163,324 A | * | 12/2000 | Holder ......................... | 345/505 |
| 6,446,191 B1 | * | 9/2002 | Pechanek et al. ............. | 712/24 |
| 6,539,125 B1 | * | 3/2003 | Harrington .................... | 382/262 |
| 6,754,684 B1 | * | 6/2004 | Kotlov .......................... | 708/202 |
| 7,038,688 B2 | * | 5/2006 | Mehta ........................... | 345/519 |
| 2002/0133688 A1 | * | 9/2002 | Lee et al. ....................... | 712/22 |
| 2003/0097391 A1 | * | 5/2003 | Saulsbury ..................... | 708/490 |
| 2004/0133765 A1 | * | 7/2004 | Tanaka et al. ................. | 712/215 |

OTHER PUBLICATIONS

P.J Narayan, Rank order filtering on SIMD machines, 1992, IEEE, 0-8186-2925, pp. 75-78.*
P.J Narayan, Rank order filtering on SIMD Machines, 1992, IEEE, 0-8186-2925, pp. 75-78.*
A. Petrosino et al. Parallel image—MIMD multicomputers, 1998 , Springer Computing 60, pp. 91-107.*
Olk et al., A programming—SIMD/MIMD—image processing, IEEE, 08186-7134-3, 1995, pp. 98-105.*

* cited by examiner

*Primary Examiner* — Samir A Ahmed
*Assistant Examiner* — Jayesh Patel
(74) *Attorney, Agent, or Firm* — Kacvinsky Daisak PLLC

(57) ABSTRACT

A system, apparatus, method and article to filter media signals are described. The apparatus may include a media processor. The media processor may include an image signal processor having multiple processing elements to concurrently process a pixel matrix by executing single instruction stream, multiple data streams instructions to determine a matrix median pixel value, and replace a pixel value from said pixel matrix with said matrix median pixel value. Other embodiments are described and claimed.

17 Claims, 8 Drawing Sheets

TECHNIQUES TO FILTER MEDIA SIGNALS

BACKGROUND

Media processing applications, such as image or video processing, may involve performance demanding operations such as filtering. Conventional filter techniques, however, typically require a relatively large magnitude of processing time to generate an output. Improvements in filtering techniques may reduce the processing time associated with filtering operations.

DETAILED DESCRIPTION

Figure 1:
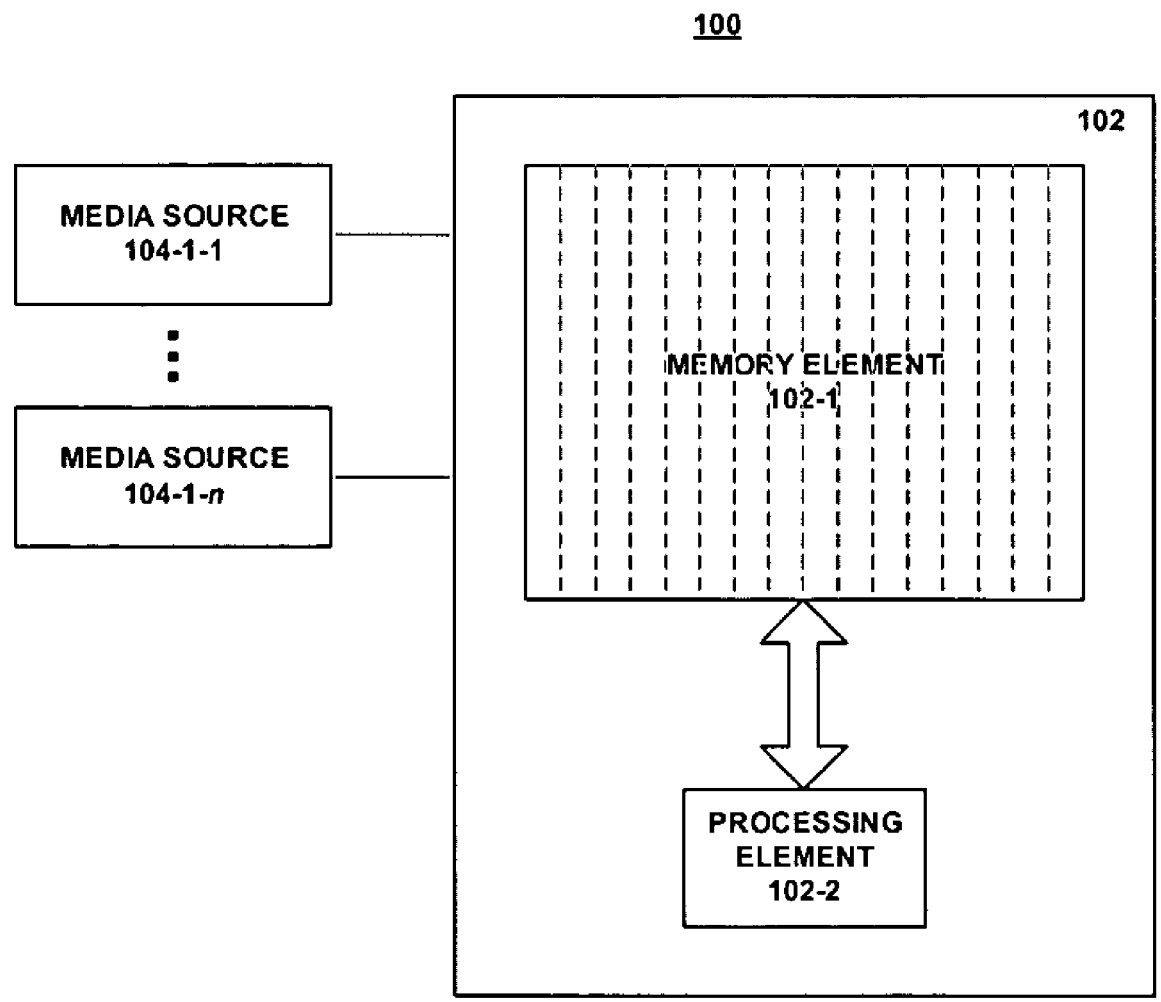
FIG. 1 illustrates one embodiment of a system.

FIG. 1 illustrates a block diagram of a system 100. In one embodiment, for example, the system 100 may comprise a communication system having multiple nodes. A node may comprise any physical or logical entity for communicating information in the system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation. The embodiments are not limited in this context.

In various embodiments, a node may comprise a media processing system, a set top box (STB), a television, a consumer appliance, a processing system, a computer system, a computer sub-system, a computer, a workstation, a terminal, a server, a personal computer (PC), a laptop, an ultra-laptop, a handheld computer, a personal digital assistant (PDA), a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a media processor, and so forth. The embodiments are not limited in this context.

In various embodiments, the nodes of system 100 may communicate, manage, or process information in accordance with one or more protocols. A protocol may comprise a set of predefined rules or instructions for managing communication among nodes. A protocol may be defined by one or more standards as promulgated by a standards organization, such as the Internet Engineering Task Force (IETF), International Telecommunications Union (ITU), the International Organization for Standardization (ISO), the International Electrotechnical Commission (IEC), the Institute of Electrical and Electronics Engineers (IEEE), and so forth. The embodiments are not limited in this context.

As shown in FIG. 1, the system 100 may comprise a media processing node 102. In various embodiments, the media processing node 102 may be arranged to process one or more types of information, such as media information. Media information generally may refer to any data representing content meant for a user, such as image information, video information, graphical information, audio information, voice information, textual information, numerical information, alphanumeric symbols, character symbols, and so forth. The embodiments are not limited in this context.

In various embodiments, media information may comprise image information. Image information generally may refer to any data derived from or associated with one or more static or video images. In one embodiment, for example, image information may comprise one or more pixels derived from or associated with an image, region, object, picture, video, reel, frame, clip, feed, stream, and so forth. The values assigned to pixels may comprise real numbers and/or integer numbers. The embodiments are not limited in this context.

In various embodiments, media processing node 102 may be arranged to process media information received from media source nodes 104-1-n, with n representing any positive integer. The media processing node 102 may be connected to one or more media source nodes 104-1-n through one or more wired and/or wireless communications media, as desired for a given implementation.

Media source nodes 104-1-n may comprise any media source capable of delivering media information (e.g., image information, video information, audio information, or audio/video information) to a destination node and/or to an intermediary node, such as media processing node 102. An example of a media source may include a source for video signals, such as from a computer to a display. Other examples of a media source may include a digital camera, A/V camcorder, video surveillance system, teleconferencing system, telephone system, medical and measuring instruments, scanner system, copier system, and other sources needing image and audio processing operations. Another example of a media source may include a source for audio signals. The audio source may be arranged to source or deliver standard audio information, such as analog or digital music. The embodiments are not limited in this context.

Another example of a media source may include a source for audio/video (A/V) signals such as television signals. The media source may be arranged to source or deliver standard analog television signals, digital television signals, high definition television (HDTV) signals, and so forth. The television signals may include various types of information, such as television audio information, television video information, and television control information. The television video information may include content from a video program, computer generated images (CGI), and so forth. The television audio information may include voices, music, sound effects, and so forth. The television control information may be embedded control signals to display the television video and/or audio information, commercial breaks, refresh rates, synchronization signals, and so forth. The embodiments are not limited in this context.

In some embodiments, media source nodes 104-1-n may originate from a number of different devices or networks. For example, media source nodes 104-1-n may include a device arranged to deliver pre-recorded media stored in various formats, such as a Digital Video Disc (DVD) device, a Video Home System (VHS) device, a digital VHS device, a computer, a gaming console, a Compact Disc (CD) player, and so forth. In yet another example, media source nodes 104-1-n may include media distribution systems to provide broadcast or streaming analog or digital television or audio signals to media processing node 102. Examples of media distribution systems may include, for example, Over The Air (OTA) broadcast systems, terrestrial cable systems (CATV), satellite broadcast systems, and so forth. The types and locations of media source nodes 104-1-n are not limited in this context.

In some embodiments, media source nodes 104-1-n may originate from a server connected to the media processing node 102 through a network. A server may comprise a computer or workstation, such as a web server arranged to deliver Hypertext Markup Language (HTML) or Extensible Markup Language (XML) documents via the Hypertext Transport Protocol (HTTP), for example. A network may comprise any type of data network, such as a network operating in accordance with one or more Internet protocols, such as the Transport Control Protocol (TCP) and Internet Protocol (IP). The embodiments are not limited in this context.

In various embodiments, the media processing node 102 may comprise, or be implemented as, one or more of a media processing system, a media processing sub-system, a media processor, a media computer, a media device, a media encoder, a media decoder, a media coder/decoder (CODEC), a media compression device, a media decompression device, a media filtering device, a media transformation device a media entertainment system, a media display, STB, or any other media processing architecture. The embodiments are not limited in this context.

In various embodiments, for example, the media processing node 102 may perform media processing operations such as encoding and/or compressing of media data into a file that may be stored or streamed, decoding and/or decompressing of media data from a stored file or media stream, media filtering, media playback, internet-based media applications, teleconferencing applications, and streaming media applications. Examples of media filtering may include median filtering, rank filtering, graphic scaling, deblocking filtering, and so forth. The embodiments are not limited in this context.

In various embodiments, the media processing node 102 may comprise multiple elements, such as elements 102-1-p, where p represents any positive integer. Although FIG. 1 shows a limited number of elements by way of example, it can be appreciated that more or less elements may be used for a given implementation. The embodiments are not limited in this context.

Elements 102-1-p may comprise, or be implemented as, one or more systems, sub-systems, processors, devices, machines, components, circuits, registers, modules, applications, programs, subroutines, or any combination thereof, as desired for a given set of design or performance constraints. In various embodiments, elements 102-1-p may be connected by one or more communications media. Communications media generally may comprise any medium capable of carrying information signals. For example, communication media may comprise wired communication media, wireless communication media, or a combination of both, as desired for a given implementation. The terms "connection" or "interconnection," and variations thereof, in this context may refer to physical connections and/or logical connections. The embodiments are not limited in this context.

In various embodiments, the media processing node 102 may comprise a memory element 102-1. The memory element 102-1 may comprise, or be implemented as, any machine-readable or computer-readable media capable of storing data, including both volatile and non-volatile memory. For example, memory 102-1 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 102-1 may be included on the same integrated circuit as processor 102-1, or alternatively some portion or all of memory 102-1 may be disposed on an integrated circuit or other medium, for example a hard disk drive, that is external to the integrated circuit of processor 102-1. The embodiments are not limited in this context.

In various embodiments, the memory element 102-1 may be arranged to store media information, for example. In various implementations, the memory element 102-1 may be arranged to store one or more items of media information, such as one or more pixels of image information. In one embodiment, for example, one or more pixels of image information may be stored as words in memory element 102-1. A pixel generally may comprise multiple bits of information (e.g., 8 bits), and a word may have storage capacity for a certain amount of information (e.g., 32 bits or 4 pixels). Accordingly, in various embodiments, the memory element 102-1 may comprise multiple items of media information in a single word. In some implementations, multiple items of media information (e.g., pixels of image information) may correspond to a horizontal or vertical line of an image. The embodiments are not limited in this context.

In various embodiments, the memory element 102-1 may arrange media information as a two-dimensional (2D) matrix or array having N rows and M columns. Each row and column of a matrix may be arranged to store multiple words, items, and elements. In one example, a matrix may comprise 32 bit rows and 32 bit columns. Accordingly, in this example, media information may be arranged as a 4×4 matrix of 8 bit items. In another example, a matrix may comprise 64 bit rows and 64 bit columns. Accordingly, in this example, media information may be arranged as an 8×8 matrix of 8 bit items and/or as four 4×4 sub-matrices of 8 bit items. Although described above for two dimensions, the concepts and techniques may be applied to three or more dimensions. The embodiments are not limited in this context.

In various embodiments, media information may be arranged as one or more matrices of items (e.g., pixels of image information). For example, media information may be arranged as one or more matrices. Each matrix may, in turn, comprise multiple sub-matrices. For instance, an 8×8 matrix may comprise four 4×4 sub-matrices, and a 32×32 matrix may comprise sixteen 4×4 sub-matrices. It is to be understood that the term "matrix" along with its derivatives may comprise, or be implemented, as any matrix or sub-matrix of any size. The embodiments are not limited in this context.

In various embodiments, media processing node 102 may comprise a processing element 102-2. The processing element 102-2 may comprise, or be implemented as one or more processors capable of providing the speed and functionality desired for an embodiment and may include accompanying architecture. For example, the processing element 102-2 may be implemented as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing element 102-2 may be implemented as a general purpose processor, such as a processor made by Intel® Corporation, Santa Clara, Calif. The processing element 102-2 may also be implemented as a dedicated processor, such as a controller, microcontroller, embedded processor, a digital signal processor (DSP), a network processor, a media processor, an input/output (I/O) processor, and so forth. The embodiments are not limited in this context.

In various embodiments, the processing element 102-2 may comprise, or be implemented as, one or more of a media processing system, a media processing sub-system, a media processor, a media computer, a media device, a media encoder, a media decoder, a media coder/decoder (CODEC), a media compression device, a media decompression device, a media filtering device (e.g., graphic scaling device, deblocking filter, separable 2D filter), a media transform device (e.g., discrete cosine transform device, inverse discrete cosine transform device, fast Fourier transform device, inverse fast Fourier transform device), a media entertainment system, a media display, or any other media processing architecture. The embodiments are not limited in this context.

In various embodiments, the processing element 102-2 may be arranged to process media information, for example. In various implementations, the processing element 102-2 may be arranged to process one or more items of media information, such as one or more pixels of image information. In one embodiment, for example, media processing node 102 may perform processing operations on a matrix of media information, such as pixels of image information. The processing operations may be performed in a horizontal direction and in a vertical direction of the matrix.

In various implementations, processing operations performed by the media processing node 102 may comprise filtering media information. For example, the media processing node 102 may perform horizontal and/or vertical filtering for a 3×3 pixel matrix of a frame. In one embodiment, the media processing node 102 may perform median or rank filtering (collectively referred to herein as "median filtering") on pixels of image information. The embodiments are not limited in this context.

In one embodiment, media processing node 102 may filter pixel matrices using median filtering techniques. A median filter is an image-processing technique to reduce impulse signal noise found in many electronic devices, such as a charged-coupled device (CCD), by replacing each pixel with the median of its neighbors (inclusive). For example, a median filter may replace each pixel p by its rank relative to the pixels in some neighborhood of p. Thus if p is the brightest pixel in its neighborhood, it is mapped to white. If p is the darkest pixel, it is mapped to black. Further, if p is the median pixel, it is mapped to 50% (gray). Conventional median filter techniques, however, typically require a relatively large magnitude of processing time to generate an output. For example, up to 30 comparison steps may occur, demanding up to ten clock cycles of processing time.

Some embodiments of the media processing node 102 may solve these and other problems. In one embodiment, for example, the media processing node 102 may include a media processor. The media processor may be arranged to perform median filtering using a reduced number of processing cycles relative to conventional techniques. In one embodiment, for example, the media processor may be arranged to perform median filtering at a rate of approximately 3.5 processing cycles per output pixel. A media processor suitable for use with media processing node 102 may be described in more detail with reference to FIG. 2.

Figure 2:
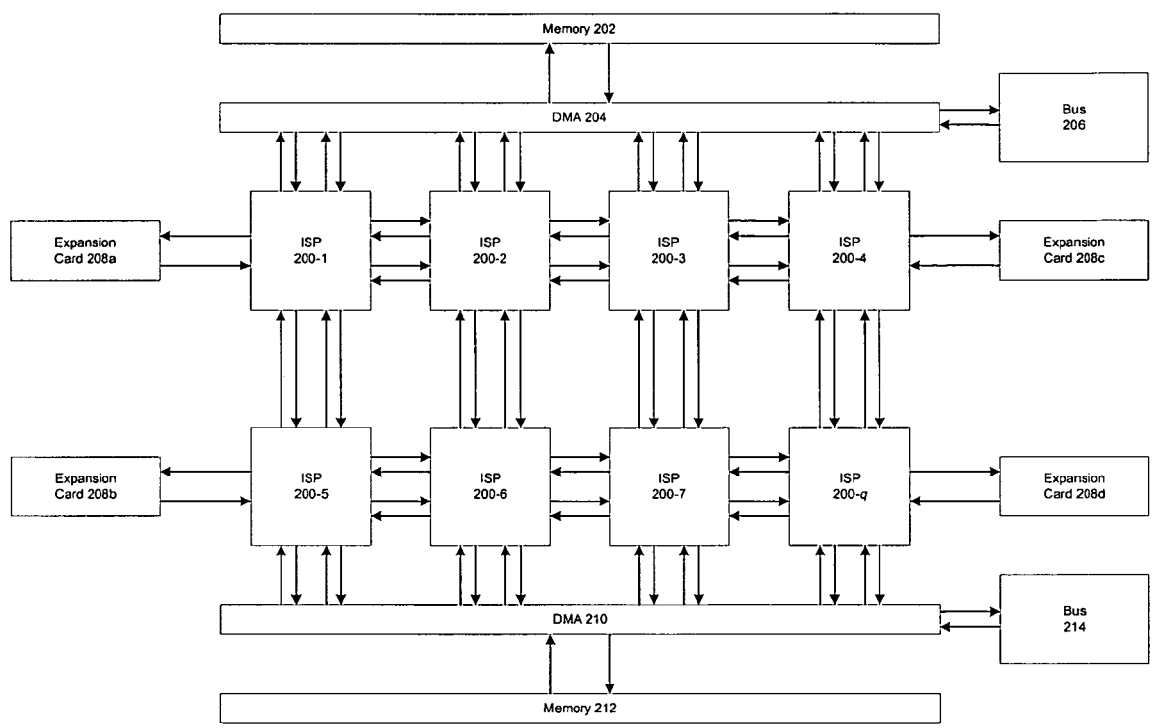
FIG. 2 illustrates one embodiment of a media processor.

FIG. 2 illustrates one embodiment of a media processor. The media processor 102-2 may perform various media processing operations for media processing node 102. Although FIG. 2 shows a limited number of elements for the media processor 102-2 by way of example, it can be appreciated that more or less elements may be used in media processor 102-2 as desired for a given implementation. The embodiments are not limited in this context.

In one embodiment, media processor 102-2 may be implemented as a multiple instruction streams, multiple data streams (MIMD) processor arranged to operate in accordance with a single instruction stream, multiple data streams (SIMD) instruction set. Examples for the media processor 102-2 may include a media processor from a series of media processors made by Intel Corporation, such as an MXP5800 Digital Media Processor, an MXP5400 Digital Media Processor, and so forth. In one embodiment, for example, the media processor 102-2 may be implemented using an MXP5800. The embodiments, however, are not limited in this context.

The media processor 102-2 may include multiple image signal processors (ISP) 200-1-q. In one embodiment, for example, the media processor 102-2 may include eight ISP 200-1-8 coupled to each other via programmable ports (e.g., quad ports). The quad ports may form a mesh-connected grid to flexibly route data among the ISP 200-1-q. Each ISP 200-1-q may have five 16-bit arithmetic logic units (ALU) with dual MAC units, totaling 40 ALU units and 16 MAC units for the entire media processor 102-2. Although media processor 102-2 is shown in FIG. 2 with eight ISP 200-1-8, it may be appreciated that any number of ISP may be used as desired for a given implementation. The embodiments are not limited in this context.

In addition, the quad ports may couple the ISP 200-1-q to other elements. For example, the quad ports may couple ISP 200-1-q to various memory units, such as memory units 202, 212. Memory units 202, 212 may comprise, for example, dual data rate (DDR) SDRAM memory units including DDR 266× 16 interfaces. The quad ports may also couple the ISP 200-1-q to direct memory access (DMA) units 204, 210. Each DMA unit 204, 210 may include an 18 channel DMA interface, thereby providing 36 channels to support memory units 202, 212. DMA units 204, 210 may be connected to buses 206, 214. Buses 206, 214 may comprise, for example, peripheral component interconnect (PCI) buses. In one embodiment, for example, the PCI buses 206, 214 may comprise 32-bit buses operating at 66 MHz. The embodiments are not limited in this context.

In general operation, the media processor 102-2 may receive an input stream of pixel values and perform various image processing operations on the pixel stream using one or more of the ISP 200-1-q. An example of an ISP 200-1-q suitable for use with the media processor 102-2 may be described in more detail with reference to FIG. 3.

Figure 3:
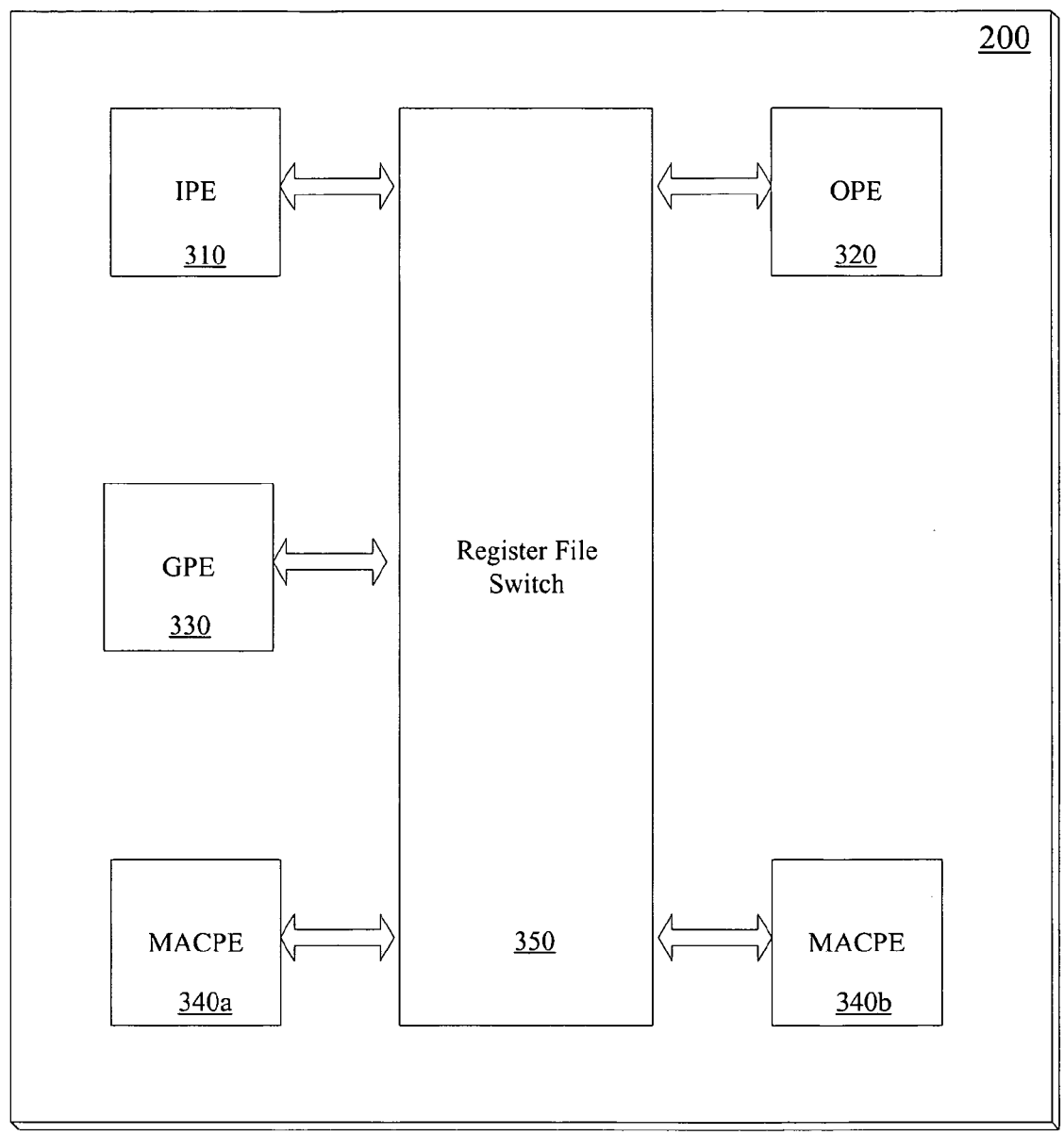
FIG. 3 illustrates one embodiment of an image signal processor.

FIG. 3 illustrates one embodiment of an ISP. FIG. 3 may illustrate an ISP 200 from ISP 200-1-q. The ISP 200 may include multiple processing elements (PE) coupled to a register file switch 350. In particular the multiple PE may include an input PE (IPE) 310, an output PE (OPE) 320, a general purpose PE (GPE) and two multiply-accumulate PE (MACPE) 340*a* and 340*b*. Register file switch 350 provides a fast and efficient interconnect mechanism between the various PE.

In one embodiment, individual threads are mapped to the PE in such a way as to minimize the communication overhead. In a further embodiment, the programming model of ISP 200 is such that each PE implements a part of an algorithm and data flows from one PE to another and from one ISP to another in a pipeline manner until the data is completely processed.

According to one embodiment, each PE uses a data driven technique to process data. In a data driven technique, each piece of data in the system has a set of Data Valid (DV) bits that indicate for which PE the data is intended. Thus, if a register data is intended for two PE (e.g., GPE 330 and MACPE 340), the DV bits 0 and 1 of the register is set. If GPE 330 no longer needs the data, then it resets the DV bit.

When the DV bits for all of the consumer PE in a register are reset, the producer PE can go ahead and write new data into the register with a new set of DV bit settings. Otherwise, the producer PE is stalled until the various consumer PE have reset their respective DV bits. Similarly, if a PE attempts to read a piece of data from a register and if its DV bit is not set, the PE stalls until there is a data with DV bit corresponding to the consumer PE set. This technique allows the various PE to share and use the registers, while potentially reducing the complexity of the user-programming model.

In one embodiment, the IPE 310 is coupled to quad ports to receive input data streams and to route the data to other PE within the ISP 200. The OPE 320 is coupled to the quad ports to transmit outgoing data streams (e.g., to an adjacent ISP 200-1-q) once the data has been processed at the ISP 200. The GPE 330 is a basic PE upon which the other PE may be constructed. The MACPE 340*a-b* performs mathematical operations, such as multiply and accumulate operations, for a particular ISP 200. Although not shown in FIG. 3, each PE may also include a multitude of local registers (LR) and indirect registers (IR). The embodiments are not limited in this context.

According to one embodiment, the various PE within ISP 200 may be arranged to perform median filtering operations. Median filters are a class of non-linear filter commonly used in image and video processing. The median filter operates on a set of pixel values. The median filter may use a rank algorithm to rank the pixel values. For example, a median filter of order n arranges input pixel values in ascending order of magnitude and outputs $n^{th}$ element. For example, a non-linear 3×3 kernel-size median filter receives a 2-D pixel matrix of 3 rows of 3 elements each. The input pixel values are arranged in ascending order of magnitude and rank 5 outputs the $5^{th}$ element of this sorted pixel matrix.

There are a number of rank algorithms suitable for use with median filtering. One approach is to sort the 9-element pixel matrix using bubble sort or quick sort and then pick the fifth element. An alternative would be to sort until the fifth element. The fifth element represents the median value of the pixel matrix. The median value may be used to reduce noise in an image. This approach of sorting until the fifth element, however, may involve 30 comparisons in total (e.g., 8 comparisons to obtain the $1^{st}$ element, 7 comparisons to obtain the $2^{nd}$ element . . . , and 4 comparisons to obtain the $5^{th}$ element). Another approach is the Waltz algorithm. The Waltz algorithm may use fewer comparisons relative to the bubble sort or quick sort approaches. The Waltz algorithm may be further described with reference to FIG. 4.

Figure 4:
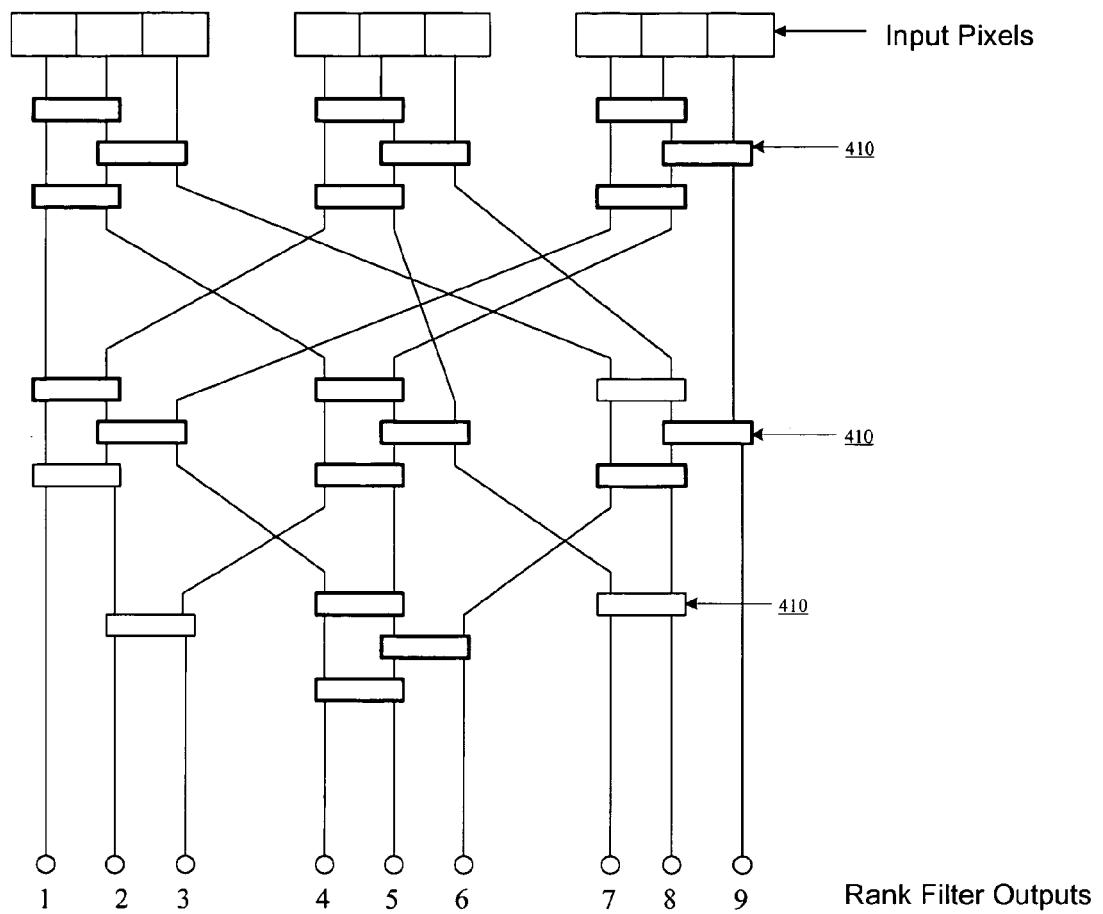
FIG. 4 illustrates a first embodiment for a rank algorithm.

FIG. 4 illustrates an embodiment for a rank algorithm. FIG. 4 illustrates a Waltz rank algorithm. The algorithm is implemented via a multitude of comparison operations 410. Each comparison operation 410 may compare two input values and provide two output values. The left output value may represent the minimum value of the compared values, while the right output value may represent the maximum value of the compared values. As shown in FIG. 4, twenty-three comparison operations 410 may be used to rank nine values. Only nineteen comparison operations 410, however, are involved in calculating the fifth element. These nineteen comparison operations 410 are represented in bold-faced blocks in FIG. 4.

Figure 5:
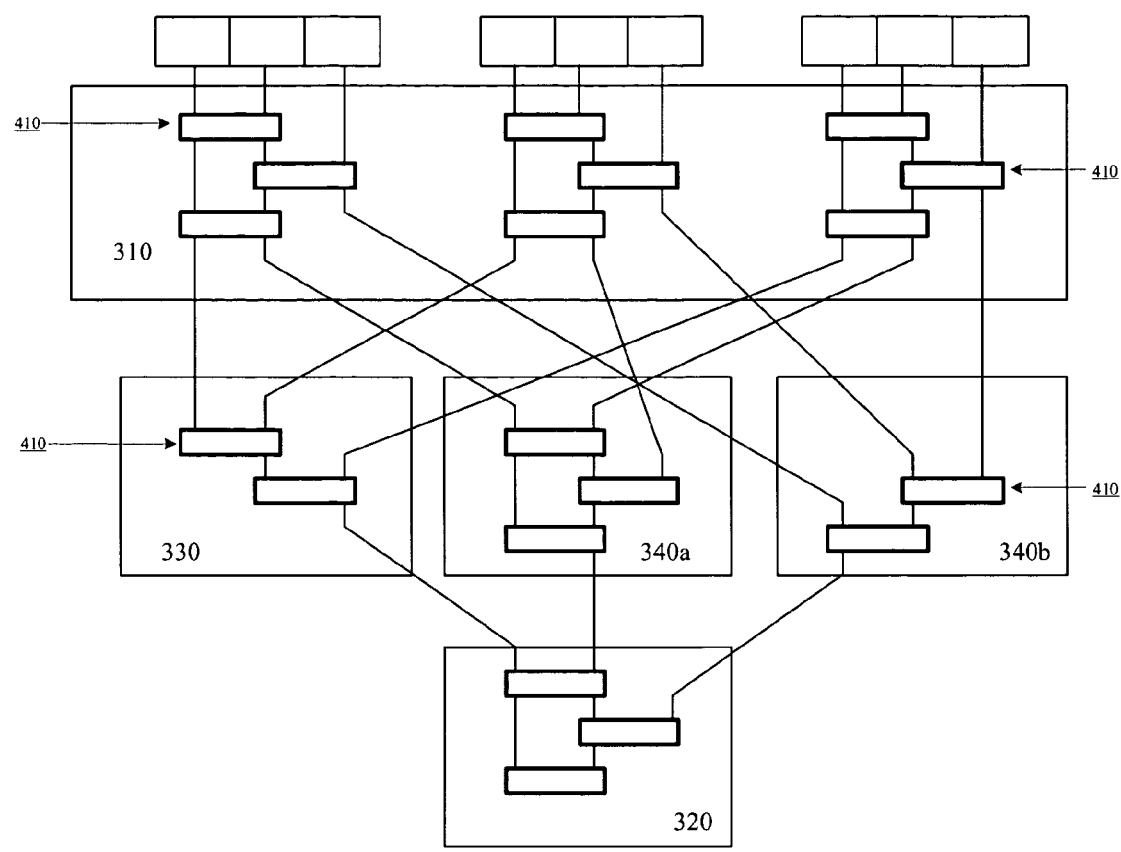
FIG. 5 illustrates an embodiment mapping a rank algorithm to multiple processing engines of an image signal processor.

FIG. 5 illustrates an embodiment mapping a rank algorithm to multiple PE of an ISP. In one embodiment, the various comparison operations 410 of the Waltz rank algorithm as described with reference to FIG. 4 may be performed by different PE of an ISP 200. According to one embodiment, input pixel values from a 3×3 pixel matrix are received at the ISP 200. The multiple PE of ISP 200 may operate in a pipeline manner to concurrently process a pixel matrix by executing one or more SIMD instructions to determine a matrix median pixel value. The matrix median pixel value may be used for media filter operations, such as replacing a pixel value from the pixel matrix with the matrix median pixel value. The embodiments are not limited in this context.

In one embodiment, the IPE 310 may be used to perform a first stage of the median filter comparison operations 410 to sort the pixel values. The IPE 310 may sort each column of a pixel matrix to form a first row of minimum pixel values for the columns, a second row of median pixel values for the columns, and a third row of maximum pixel values for the columns.

In one embodiment, the GPE 330 and the MACPE 340*a-b* may perform a second stage of the median filter comparison operations 410. For example, the GPE 330 may determine a maximum pixel value for the first row of minimum pixel values. The MACPE 340*a* may determine a first median pixel value and a second median pixel value for the second row of median pixel values using one or more SIMD instructions. The MACPE 340*b* may determine a minimum pixel value for the third row of maximum pixel values.

In one embodiment, the MACPE 340*a* may determine the first and second median pixel values using SIMD instructions to reduce operation counts. The SIMD instructions may allow operations on 2 adjacent output pixels simultaneously. For example, the MACPE 340*a* may couple to a first register containing a first pixel value and a second pixel value, and a second register containing a third pixel and a fourth pixel. The MACPE 340*a* may determine the first median pixel value using the first pixel, the second pixel and the third pixel. The MACPE 340*a* may determine the second median pixel value using the second pixel, the third pixel and the fourth pixel. By determining multiple median pixel values using SIMD instructions, the number of operation counts used by the MACPE 340*a* may be reduced, thereby improving the overall performance of the ISP 200.

In one embodiment, the OPE 320 may be used to perform a third stage of the median filter comparison operations 410. The OPE 320 may output a matrix median pixel value for a given 3×3 pixel matrix. OPE 320 receives the maximum minimum value, the median of median value and the minimum maximum value and outputs the matrix median pixel value for the 3×3 pixel matrix.

In one embodiment, the OPE 320 may compute the matrix median pixel value for a given pixel matrix using the first and second median pixel values generated by MACPE 340*a*. For example, the OPE 320 may determine a first matrix median pixel value for a first pixel matrix using the first median pixel value. The OPE 320 may determine a second matrix median pixel value for a second pixel matrix using the second median pixel value. In this manner, the number of operation counts used by the OPE 320 may be reduced, thereby improving the overall performance of the ISP 200.

Once the ISP 200 generates the matrix median pixel value for the 3×3 pixel matrix using the rank algorithm, the ISP 200 may use the matrix median pixel value to perform median filtering operations. Median filtering operations use the median value of a selected area to replace a member of the selected area with the median value. Since the replaced pixel will be a member of the selected area, a median filter may reduce random noise with less loss of high frequency information when compared to other filters, such as a low pass linear filter, for example.

When implementing a median filter using concurrently running PE of the ISP 200, the maximum throughput may be limited by the PE that takes the longest to produce an output. In some embodiments, the PE that takes the longest to produce an output may be the MACPE 340a. Using SIMD instructions, the MACPE 340a may be implemented using 7 instructions with a performance of approximately 3.5 cycles per output pixel. Consequently, the overall performance of the ISP 200 to perform median filtering may comprise approximately 3.5 cycles per output pixel.

Operations for the various embodiments may be further described with reference to the following figures and accompanying examples. Some of the figures may include logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
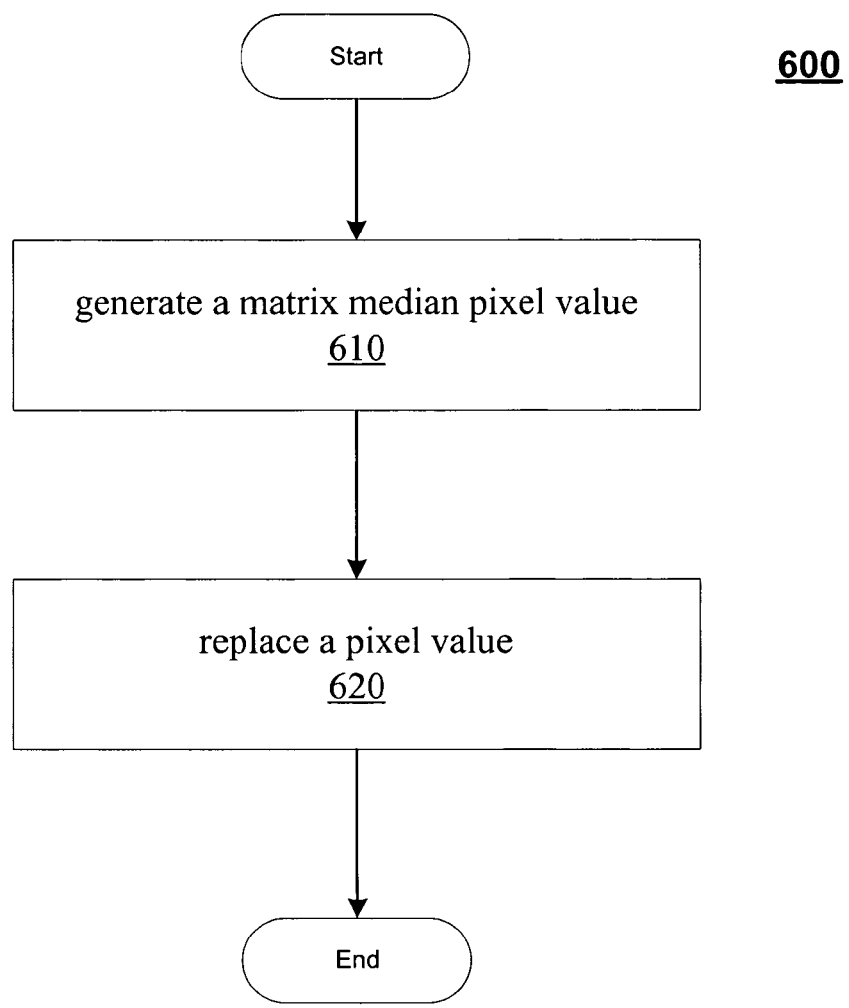
FIG. 6 illustrates an embodiment of a first logic diagram.

FIG. 6 illustrates one embodiment of a logic diagram. FIG. 6 illustrates a logic flow 600. The logic flow 600 may be representative of the operations executed by one or more structure described herein, such as an ISP 200 of the media processor 102. More particularly, the logic flow 600 may be representative of the operations executed by the ISP 200 to perform median filtering. As shown in FIG. 6, a matrix median pixel value for a pixel matrix may be generated using a SIMD instruction to process multiple pixel values in parallel at block 610. A pixel value from the pixel matrix may be replaced with the matrix median pixel value at block 620. The embodiments are not limited in this context.

Figure 7:
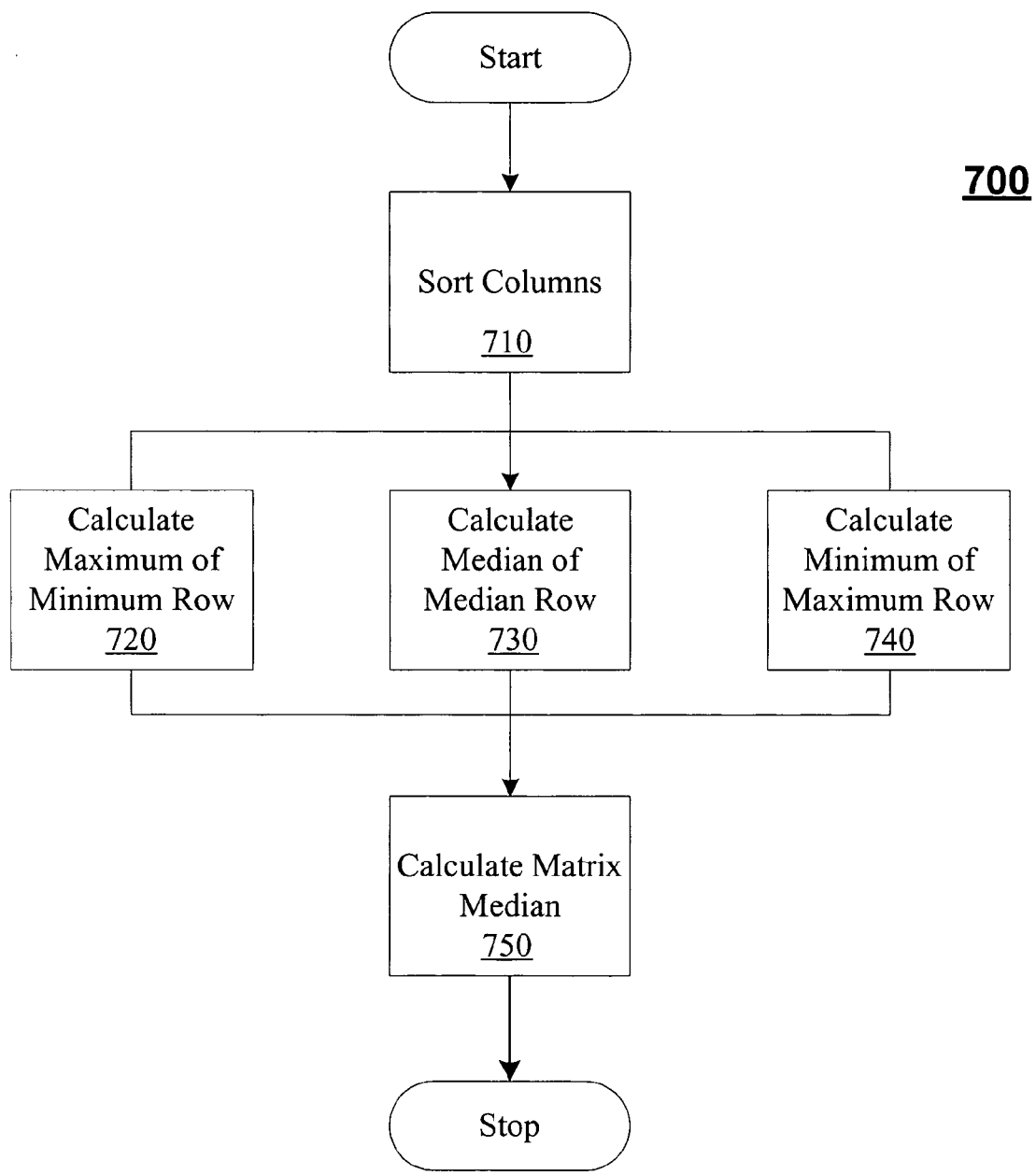
FIG. 7 illustrates an embodiment of a second logic diagram.

FIG. 7 illustrates one embodiment of a logic diagram. FIG. 7 illustrates a logic flow 700. The logic flow 700 may be representative of the operations executed by one or more structure described herein, such as an ISP 200 of the media processor 102-2. More particularly, the logic flow 700 may be representative of the operations executed by the ISP 200 to perform the operations of block 610 as described with reference to FIG. 6. The embodiments are not limited in this context.

As shown in FIG. 7, columns from a first pixel matrix may be sorted at block 710. For example, each column of a first pixel matrix may be sorted to form a first row of minimum pixel values for the columns, a second row of median pixel values for the columns, and a third row of maximum pixel values for the columns.

The operations of block 710 may be performed by the IPE 310 of the ISP 200. In one embodiment, for example, the IPE 310 may be arranged to execute the following example instructions:

MNMNUU MAG0D=, QPN0=, temp;
MXMXUU MAG0D, QPN0=, temp1;
MNMNUU MAG1D=, temp, MN0MN1_out>GPE;
MXMXUU MAG1D, temp, temp2;
MNMNUU temp1, temp2, MD0MD1_out>MACPE3;
MXMXUU temp1, temp2, MX0MX1_out>MACPE2; and
LDt QPN0, MAG2D>MCH.

Using these instructions, the IPE 310 may operate at approximately 3.5 clock cycles per byte. The embodiments are not limited in this context.

A maximum of the minimum row may be calculated at block 720. For example, a maximum pixel value may be determined for the first row of minimum pixel values.

The operations of block 720 may be performed by the GPE 330 of the ISP 200. In one embodiment, for example, the GPE 330 may be arranged to execute the following example instructions:

MXMXUU mn0mn1, MN0MN1_out=, tmp02_13;
PCKL1H2 nm0mn1, MN0MN1_out=, tmp12;
MXMXUU tmp02_13, tmp12, MXN012MXN123>OPE; and
LDt MN0MN1_out, mn0mn1.

Using these instructions, the GPE 330 may operate at approximately 2 clock cycles per byte. The embodiments are not limited in this context.

A median of the median row may be calculated at block 730. For example, a first median pixel value and a second median pixel value may be determined for the second row of median pixel values. The first and second median pixel values may be determined using, for example, one or more SIMD instructions.

The operations of block 730 may be performed by the MACPE 340a of the ISP 200. In one embodiment, for example, the MACPE 340a may be arranged to execute the following example instructions:

MXMXUU md0md1, MD0MD1out=, tmp02_13;
PCKL1H2 md0md1, MD0MD1_out=, tmp12;
MXMXUU MD0MD1_out=, tmp12, tmp12_23;
MXMXUU md0md1, tmp12, tmp01_12;
MNMNUU tmp02_13, tmp12_23, tmp12;
LDt MD0MD1_out, md0md1; and
MNMNUU tmp12, tmp01_12, MDD012MDD123>OPE.

Using these instructions, the MACPE 340a may operate at approximately 3.5 clock cycles per byte. The embodiments are not limited in this context.

A minimum of the maximum row may be calculated at block 740. For example, a minimum pixel value may be determined for the third row of maximum pixel values.

The operations of block 740 may be performed by the MACPE 340b of the ISP 200. In one embodiment, for example, the MACPE 340b may be arranged to execute the following example instructions:

MNMNU mx0mx1, MX0MX1_out=, tmp02_13;
PCKL1H2 mx0mx1, MX0MX1_out=, tmp12;
MNMNUU tmp02_13, tmp12, MNX012MNX123>OPE; and
LDt MX0MX1_out, mx0mx1.

Using these instructions, the MACPE 340b may operate at approximately 2 clock cycles per byte. The embodiments are not limited in this context.

A matrix median pixel value may be calculated using the output of blocks 720, 730, 740 at block 750. For example, a first matrix median pixel value may be determined for a first pixel matrix using the first median pixel value. A second matrix median pixel value may be determined for a second pixel matrix using the second median pixel value.

The operations of block 750 may be performed by the OPE 320 of the ISP 200. In one embodiment, for example, the OPE 320 may be arranged to execute the following example instructions:

MXMXUU  MXN012MXN123=, MNX012MNX123=, tmp1;
MXMXUU  MXN012MXN123, MDD012MDD123=, tmp2;
MXMXUU  MNX012MNX123, MDD012MDD123, tmp3; and
MNMNUU tmp1, tmp2, tmp4;MNMNUU tmp4, tmp3, DEST_QP.

Using these instructions, the OPE 320 may operate at approximately 2.5 clock cycles per byte. The embodiments are not limited in this context.

As previously described, when implementing a median filter using concurrently running PE of the ISP 200, the maximum throughput may be limited by the PE that takes the longest to produce an output. In some embodiments, the PE that takes the longest to produce an output may be the MACPE 340a. Using SIMD instructions, the MACPE 340a may be implemented using 7 instructions with a performance of approximately 3.5 cycles per output pixel. Consequently, the overall performance of the ISP 200 to perform median filtering may comprise approximately 3.5 cycles per output pixel.

Figure 8:
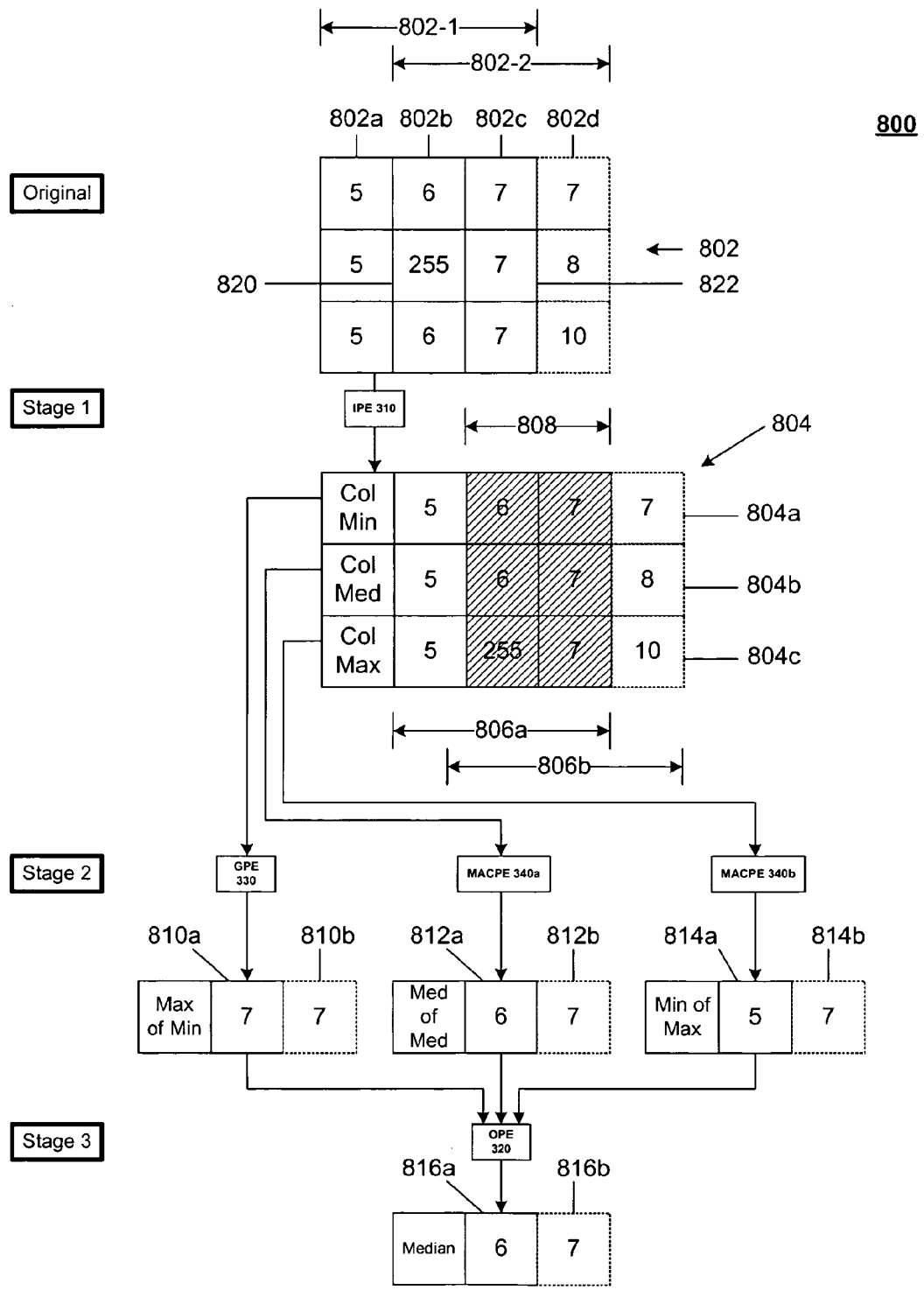
FIG. 8 illustrates an example embodiment of median filtering operations.

FIG. 8 illustrates an example embodiment of median filtering. FIG. 8 may provide an illustration to demonstrate the operation of the above described systems and associated programming logic of the various embodiments. Assume an ISP 200 of a MIMD media processor 102-2 is programmed using SIMD instructions to perform median filtering for a pixel matrix 802 stored in memory 102-1, or received in real time via one of the media sources 104-1-n. Since the ISP 200 is using SIMD instructions, which typically operates on 2 bytes of data at a time, certain output values for the various operational stages may be reused to calculate matrix median pixel values for adjacent matrices. Further, the median filtering operations may be performed by multiple PE of the ISP 200 using pipelining techniques. As a result, the ISP 200 may perform median filtering for a pixel matrix using a reduced number of processing cycles relative to conventional techniques.

In this example, assume a pixel matrix 802 is to be processed in adjacent sub-matrices of pixel values, with the sub-matrices having a predetermined size. For example, the pixel matrix 802 may be logically represented as a first 3×3 pixel matrix 802-1, and a second 3×3 pixel matrix 802-2. The first pixel matrix 802-1 may comprise the pixel values of columns 802a, 802b and 802c. The second pixel matrix 802-2 may comprise the pixel values of columns 802b, 802c and 802d. The ISP 200 may attempt to find a first matrix median pixel value representing the median value for all the pixel values in pixel matrix 802-1. The ISP 200 may also attempt to find a second matrix median pixel value representing the median value for all the pixel values in pixel matrix 802-2.

Multiple PE of ISP 200 may be arranged to operate in a pipeline manner to concurrently process the input pixel values from the pixel matrix 802 to determine the first and second matrix median pixel values. The IPE 310 may perform a first stage of the median filter comparison operations 410 to sort the pixel matrix 802. The IPE 310 may sort each column of the pixel matrix 802 to form a pixel matrix 804. The pixel matrix 804 may comprise a first row 804a having the minimum pixel values for each of the columns 802a-d. For example, the first row 804a may comprise the pixel values 5, 6, 7 and 7, which are the minimum pixel values for columns 802a, 802b, 802c, and 802d, respectively (e.g., the pixel value 5 may comprise the minimum pixel value for column 802a, pixel value 6 for column 802b, and so forth). The pixel matrix 804 may also comprise a second row 804b having the median pixel values for each of the columns 802a-d (e.g., pixel values 5, 6, 7, 8), and a third row 804c having the maximum pixel values for each of the columns 802a-d (e.g., pixel values 5, 255, 7, 10).

Since the ISP 200 is using SIMD instructions, certain output values for the various operational stages may be reused to calculate matrix median pixel values for adjacent matrices. For example, the pixel matrix 804 may be logically represented as pixel matrices 806a, 806b. Columns 808 may comprise output pixel values of the IPE 310 that may be reused to calculate the matrix median pixel values for the pixel matrices 802-1, 802-2.

The GPE 330 may perform a second stage of the median filter comparison to determine a maximum pixel value for the first row 804a. When determining the first matrix median pixel value for pixel matrix 802-1, for example, the GPE 330 may determine a first maximum pixel value 810a (e.g., pixel value 7) using the pixel values found in the first row 804a of pixel matrix 806a (e.g., pixel values 5, 6, 7). When determining the second matrix median pixel value for pixel matrix 802-2, the GPE 330 may determine a second maximum pixel value 810b (e.g., pixel value 7) using the pixel values found in the first row 804a of pixel matrix 806b (e.g., pixel values 6, 7, 7). Since the IPE 310 has already sorted pixel matrix 804 to determine the first matrix median pixel value, the operations for determining the second matrix median pixel value may be reduced by reusing certain pixel values from columns 808 of pixel matrix 804 (e.g., pixel values 6, 7).

The MACPE 340a may also perform a second stage of the median filter comparison to determine a first median pixel value 812a and a second median pixel value 812b for the second row 804b of median pixel values using the one or more SIMD instructions. When determining the first matrix median pixel value for pixel matrix 802-1, the MACPE 340a may determine the first median pixel value 812a (e.g., pixel value 6) using the pixel values found in the second row 804b of pixel matrix 806a (e.g., pixel values 5, 6, 7). When determining the second matrix median pixel value for pixel matrix 802-2, the MACPE 304a may determine a second median pixel value 812b (e.g., pixel value 7) using the pixel values found in the second row 804b of pixel matrix 806b (e.g., pixel values 6, 7, 8).

The MACPE 340b may further perform a second stage of the median filter comparison to determine a minimum pixel value for the third row of maximum pixel values. When determining the first matrix median pixel value for pixel matrix 802-1, the MACPE 340b may determine a first minimum pixel value 814a (e.g., pixel value 5) using the pixel values found in the third row 804c of pixel matrix 806a (e.g., pixel values 5, 255, 7). When determining the second matrix median pixel value for pixel matrix 802-2, the MACPE 340b may determine a second minimum pixel value 814b (e.g., pixel value 7) using the pixel values found in the third row 804c of pixel matrix 806b (e.g., pixel values 255, 7, 10).

The OPE 320 may perform a third stage of the median filter comparisons to output the first and second matrix median pixel values for pixel matrices 802-1, 802-2, respectively. The OPE 320 may compute a first matrix median pixel value 816a (e.g., pixel value 6) for pixel matrix 802-1 using the first maximum pixel value 810a, the first median pixel value 812a, and the first minimum pixel value 814a (e.g., pixel values 7, 6, 5, respectively). The OPE 320 may determine a second matrix median pixel value 816b (e.g., pixel value 7) for the pixel matrix 802-2 using the second maximum pixel value 810*b*, the second median pixel value 812*b*, and the second minimum pixel value 814*b* (e.g., pixel values 7, 7, 7, respectively).

Once the ISP 200 generates a matrix median pixel value for a pixel matrix using the rank algorithm, the ISP 200 may use the matrix median pixel value to perform median filtering operations. For example, the fifth element of the pixel matrix 802-1 may have a pixel value of 255. The pixel value 255 is significantly larger than the surrounding pixel values, thereby potentially indicating the presence of noise. Consequently, the matrix median pixel value 816*a* (e.g., pixel value 6) representing the average value for the entire pixel matrix 802-1 may be used to replace the fifth element 820 (e.g., pixel value 255) of pixel matrix 802-1 to reduce the noise. Similarly, the matrix median pixel value 816*b* (e.g. pixel value 7) may be used to replace the fifth element 822 (e.g., pixel value 7) of pixel matrix 802-2.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

In the description and claims, the terms coupled and connected, along with their derivatives, may be used. In particular embodiments, connected may be used to indicate that two or more elements are in direct physical or electrical contact with each other. Coupled may also mean that two or more elements are in direct physical or electrical contact. Coupled may also mean, however, that two or more elements may not be in direct contact with each other, but yet may still cooperate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Some embodiments may have been described in terms of algorithms and symbolic representations of operations on data bits or binary digital signals within a computer memory. It may be appreciated that these algorithmic descriptions and representations may be the techniques used by those skilled in the data processing arts to convey the substance of their work to others skilled in the art. An algorithm may be considered a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the above discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
  a media processor including a first image signal processor having multiple processing elements to concurrently process a pixel matrix by executing single instruction stream, multiple data streams instructions to determine a matrix median pixel value, and replace a pixel value from said pixel matrix with said matrix median pixel value, said first image signal processor comprising:

an input processing engine to sort each column of a first pixel matrix to form a first row of minimum pixel values for said columns, a second row of median pixel values for said columns, and a third row of maximum pixel values for said columns;

an output processing engine;

a general purpose processing engine to determine a maximum pixel value for said first row of minimum pixel values;

a first multiply and accumulate processing engine to determine a first median pixel value and a second median pixel value simultaneously for the second row of median pixel values from said pixel matrix using said single instruction stream, multiple data streams instructions;

a second multiply and accumulate processing engine; and a register file switch to couple to and interconnect each of said processing engines, wherein said processing engines process data based on a set of bits indicating for which processing engine the data is intended.

2. The apparatus of claim 1, wherein said media processor comprises a multiple instruction streams, multiple data streams processor.

3. The apparatus of claim 1, said first multiply and accumulate processing engine to couple to a first register containing a first pixel value and a second pixel value, and a second register containing a third pixel and a fourth pixel, said first multiply and accumulate processing engine to determine said first median pixel value using said first pixel, said second pixel and said third pixel, and said second median pixel value using said second pixel, said third pixel and said fourth pixel.

4. The apparatus of claim 1, said second multiply and accumulate processing engine to determine a minimum pixel value for said third row of maximum pixel values.

5. The apparatus of claim 4, said output processing engine to determine a first matrix median pixel value for said first pixel matrix using said first median pixel value, and a second matrix median pixel value for a second pixel matrix using said second median pixel value.

6. A system, comprising:

a media source to generate a stream of pixel values;

a media processing system to couple to said media source, said media processing system to comprise:

a memory to store said pixel values; and a media processor to couple to said memory, said media processor to include a first image signal processor having multiple processing elements to concurrently process a pixel matrix by executing single instruction stream, multiple data streams instructions to determine a matrix median pixel value, and replace a pixel value from said pixel matrix with said matrix median pixel value, said first image signal processor comprising:

an input processing engine to sort each column of a first pixel matrix to form a first row of minimum pixel values for said columns, a second row of median pixel values for said columns, and a third row of maximum pixel values for said columns;

an output processing engine;

a general purpose processing engine to determine a maximum pixel value for said first row of minimum pixel values;

a first multiply and accumulate processing engine to determine a first median pixel value and a second median pixel value simultaneously for the second row of median pixel values from said pixel matrix using said single instruction stream, multiple data streams instructions;

a second multiply and accumulate processing engine; and a register file switch to couple to and interconnect each of said processing engines, wherein said processing engines process data based on a set of bits indicating for which processing engine the data is intended.

7. The system of claim 6, said second multiply and accumulate processing engine to determine a minimum pixel value for said third row of maximum pixel values.

8. The system of claim 6, said first multiply and accumulate processing engine to couple to a first register containing a first pixel value and a second pixel value, and a second register containing a third pixel and a fourth pixel, said first multiply and accumulate processing engine to determine said first median pixel value using said first pixel, said second pixel and said third pixel, and said second median pixel value using said second pixel, said third pixel and said fourth pixel.

9. The system of claim 8, said output processing engine to determine a first matrix median pixel value for said first pixel matrix using said first median pixel value, and a second matrix median pixel value for a second pixel matrix using said second median pixel value.

10. A computer-implemented method to perform median filtering, comprising:

a media processor including an imagine signal processor for generating a matrix median pixel value for a pixel matrix using a single instruction stream, multiple data streams instruction to process multiple pixel values in parallel using processing engines, interconnected via a file register switch, that process data based on a set of bits indicating for which processing engine the data is intended;

sorting each column of a first pixel matrix to form a first row of minimum pixel values for said columns, a second row of median pixel values for said columns, and a third row of maximum pixel values for said columns;

determining a maximum pixel value for said first row of minimum pixel values;

determining a first median pixel value and a second median pixel value simultaneously for the second row of median pixel values from said pixel matrix using said single instruction stream, multiple data streams instructions; and replacing a pixel value from said pixel matrix with said matrix median pixel value.

11. The computer-implemented method of claim 10, comprising determining a minimum pixel value for said third row of maximum pixel values.

12. The computer-implemented method of claim 11, comprising determining a first matrix median pixel value for said first pixel matrix using said first median pixel value, and a second matrix median pixel value for a second pixel matrix using said second median pixel value.

13. The computer-implemented method of claim 12, comprising replacing a pixel value for said first pixel matrix with said first median pixel value, and a pixel value for said second pixel matrix with said second median pixel value.

14. An article comprising a computer-readable storage medium containing instructions that if executed by a computer enable a system to generate a matrix median pixel value for a pixel matrix using a single instruction stream, multiple data streams instruction to process multiple pixel values in parallel using processing engines, interconnected via a file register switch, that process data based on a set of bits indicating for which processing engine the data is intended, sort each column of a first pixel matrix to form a first row of minimum pixel values for said columns, a second row of median pixel values for said columns, and a third row of maximum pixel values for said columns, determine a maximum pixel value for said first row of minimum pixel values, determine a first median pixel value and a second median pixel value simultaneously for the second row of median pixel values from said pixel matrix using said single instruction stream, multiple data streams instructions; and replace a pixel value from said pixel matrix with said matrix median pixel value.

15. The article of claim 14, further comprising instructions that if executed enable the system to determine a minimum pixel value for said third row of maximum pixel values.

16. The article of claim 15, further comprising instructions that if executed enable the system to determine a first matrix median pixel value for said first pixel matrix using said first median pixel value, and a second matrix median pixel value for a second pixel matrix using said second median pixel value.

17. The article of claim 16, further comprising instructions that if executed enable the system to replace a pixel value for said first pixel matrix with said first median pixel value, and a pixel value for said second pixel matrix with said second median pixel value.

* * * * *